March 18, 1952 — M. W. DICKOVER — 2,589,681
BATTERY PLATE
Filed June 20, 1947
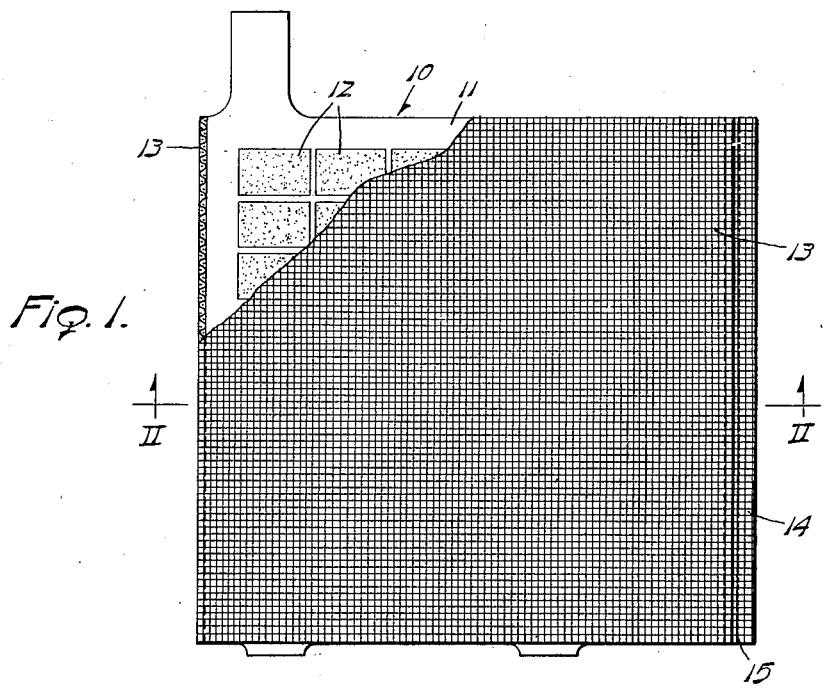
Fig. 1.
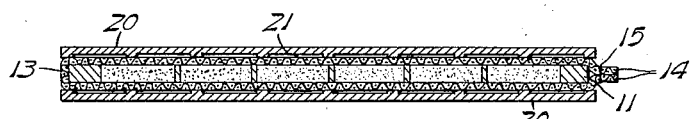
Fig. 2.
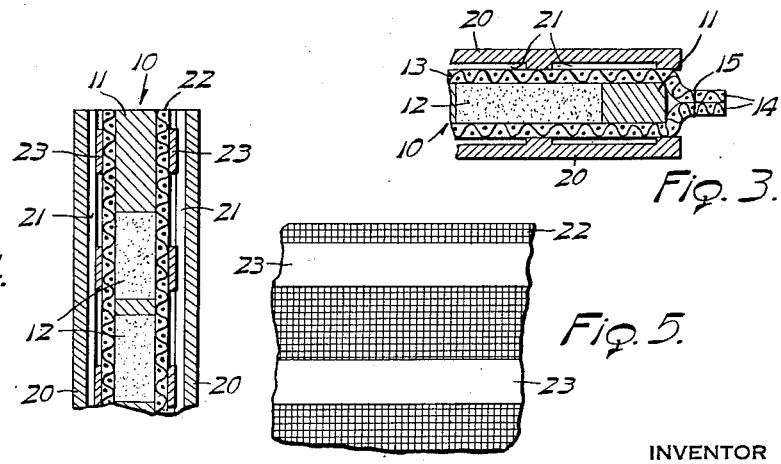
Fig. 3.
Fig. 4.
Fig. 5.
INVENTOR
Marion Ward Dickover
BY
Bean, Brooks, Buckley & Bean
ATTORNEYS Patented Mar. 18, 1952

2,589,681

UNITED STATES PATENT OFFICE 2,589,681

BATTERY PLATE

Marion Ward Dickover, Williamsville, N. Y., assignor to National Battery Company, St. Paul, Minn.

Application June 20, 1947, Serial No. 755,912

4 Claims. (Cl. 136—147)

My invention relates to plate units of storage or secondary batteries of the type wherein glass mats are used next to the active material to keep the same in place within the grid. Such use, however, requires employment of some porous cage or retainer to keep the mats in place against the material and to prevent their being forced into the grooves of the separators, thereby cutting off or restricting the circulation of electrolyte therethrough. In the present invention I have dispensed with all such mats and have provided an envelope of woven glass fabric wrapped around the plate and in paste-retaining contact therewith.

One of the principal objects of the invention is to provide an improved storage battery plate unit. Another object of the invention is to provide a storage battery plate unit having an increased life over similar plate units of batteries of the prior art, thereby avoiding the accumulation of displaced active material at the bottom of the battery such as would result in short circuiting of the plates.

A further object of the invention is to provide means for retaining the active paste material within the grid of the plate over a longer period of service, while at the same time reducing the internal resistance of the battery embodying my invention.

Another object of the invention is to provide an envelope for a battery plate which will retain the paste materials in place and prevent exudation of the active plate material into the electrolyte spaces of the battery.

A further object of the invention is to provide an envelope having a plurality of stiffening strips secured to the envelope to stiffen the same against creep into the separator grooves.

Moreover, the paste retaining means of my invention is of such nature as to resist deterioration in the presence of the battery chemicals, while permitting free and unobstructed circulation of the battery electrolyte and free escape of gases from the paste material.

Moreover, since my plate envelope retains the active paste material within the grid, the size of the battery may be reduced by reason of the fact that there need be substantially no provision at the bottom of the battery case for accumulation of displaced active material.

Furthermore, the plate envelope of the invention is simple and rugged in construction and inexpensive to manufacture.

These and other objects which will be apparent to those skilled in the art have been accomplished by the device shown in the accompanying drawings, of which Fig. 1 is a side elevation of a storage battery plate unit with a portion broken away;

Fig. 2 is a sectional view taken in line II—II of Fig. 1 showing in addition thereto a separator on each side of a positive plate;

Fig. 3 is an enlarged fragmentary section view taken in line II—II of Fig. 1;

Fig. 4 is an enlarged fragmentary vertical sectional view of a modified form of the invention; and Fig. 5 is an enlarged fragmentary side elevation of the modification shown in Fig. 4.

Referring now to the form of the invention of Figs. 1 to 3, a positive battery plate unit is shown, comprising a plate 10 having a conventional grid 11 with active paste material 12 packed in the openings thereof. Wrapped around this plate is a piece of cloth made of woven glass fibers thereby forming an envelope 13 for the plate. This envelope is stretched tightly around the plate and is therefore in intimate paste-retaining contact with the active material thereof, and the free edges 14 of the envelope are secured together along one edge of the plate, preferably by means of stitching as shown at 15. While this envelope 13 is shown extending only to the top and bottom edges of the plate, it is obvious that in cases when it is desirable to completely enclose the plate, the envelope may be made longer than the plate and extended beyond the upper and lower plate edges with the free edges thereat also secured together by stitching.

In Figs. 2 and 3, I have shown a separator 20 on each side of the plate, and since a positive plate is shown, the grooves 21 of the separator are placed in a position facing the grid. As is well known, the grooves are provided for the circulation of the battery electrolyte and it is essential that these grooves be maintained in such condition that the electrolyte of the battery will not be restricted but will have free circulation. The tensile strength of the glass fiber cloth of the envelope 13 prevents undue bulging of the envelope into the separator groove spaces; or in order to further assure non-bulging and optimum electrolyte circulation I provide the envelope as illustrated at 22 in Fig. 4 with a plurality of stiffening ridges 23. These ridges may be formed of a suitable synthetic resin or so-called plastic material and applied to the envelope while the plastic is in a fluid condition by being painted upon the outside surfaces of the envelope so that the ridges extend laterally across both sides of the envelope so as to span the grooves 21 of the separators. Thus, the ridges 23 are formed of material which is chemically inert relative to the battery chemicals and when the plastic is set it stiffens the glass fabric against bulging.

The glass fibre material of the paste retaining envelope of the invention is substantially chemically inert with respect to the chemical substances of the battery, and is tensionally rigid to such degree as to successfully maintain the battery active paste material against bulging into the separator grooves. The glass fabric material is also of such porosity as to provide for ample electrolyte circulation and ionic flow through the envelope material; and thus it will be appreciated that the envelope of the invention functions ideally yet comprises a structure of maximum simplicity such as may be inexpensively manufactured and assembled upon the battery grids. For example, it has been determined that batteries may be constructed in accord with the present invention at lower cost than batteries constructed in accord with prior art arrangements which give inferior results.

It will be understood that some modifications of the details herein shown and described may possibly be made without departing from the spirit of the invention or the scope of the appended claims, and I do not, therefore, wish to be limited to the exact details herein shown and described.

What is claimed is:

1. A rectangular storage battery plate unit comprising in combination, a grid having active paste material supported thereby, an envelope of woven glass cloth stretched tightly and wrapped about and secured to said plate and in material-retaining contact therewith; a ridged separator disposed on one side of said envelope, and a plurality of spaced stiffening elements comprising strips of plastic material painted on to the outside surfaces of said envelope for spanning contact with the ridges of said separator, whereby said envelope and paste material will be prevented from creeping into the grooves between the ridges of said separator.

2. A storage battery plate comprising a grid having openings therein, active paste material contained primarily within said grid openings, an envelope of woven glass threads stretched tightly about said grid in paste retaining contact therewith, means securing together the free edges of said envelope whereby to maintain the same tensionally taut about said grid, and thin parallel stiffening strips of plastic material coated on the outside of said envelope to reinforce said envelope against bulging.

3. A storage battery plate comprising a grid having openings therein, active paste material carried by said grid and contained primarily within said grid openings, an envelope of woven glass cloth stretched tightly about said grid in paste retaining contact therewith, means securing together the free edges of said envelope whereby to maintain the same taut about said grid, and thin parallel stiffening ribs secured on the outside of said envelope to reinforce said envelope against bulging.

4. A storage battery plate unit comprising in combination a grid, active paste material supported by said grid, an envelope of woven glass threads stretched tightly about said grid and secured tautly to said grid in material retaining contact therewith, a ridged separator disposed on one side of said envelope, and a plurality of spaced stiffening ribs secured to the outside of said envelope in spanning contact with the ridges of said separator, whereby said envelope and said paste material will be prevented from bulging into the grooves between the ridges of said separator.

MARION WARD DICKOVER.

REFERENCES CITED

The following references are of record in the file of this patent:

UNITED STATES PATENTS

| Number | Name | Date |
| --- | --- | --- |
| 309,939 | Faure | Dec. 30, 1884 |
| 693,676 | Willis | Feb. 18, 1902 |
| 2,157,629 | Rolph | May 9, 1939 |
| 2,195,211 | Hall | Mar. 26, 1940 |
| 2,490,630 | Jardine | Dec. 6, 1949 |

FOREIGN PATENTS

| Number | Country | Date |
| --- | --- | --- |
| 139,169 | Great Britain | June 16, 1921 |
| 265,000 | Great Britain | Feb. 3, 1927 |
| 300,536 | Great Britain | Nov. 13, 1928 |
| 555,827 | Germany | Apr. 23, 1931 |
| 844,212 | France | Apr. 17, 1939 |

OTHER REFERENCES

Philco, Form No. BD-595, 1944.